United States Patent
Copeland

(10) Patent No.: US 10,178,188 B2
(45) Date of Patent: Jan. 8, 2019

(54) SYSTEM FOR A MONITORED AND RECONSTRUCTIBLE PERSONAL RENDEZVOUS SESSION

(71) Applicant: Scott R. Copeland, Pasadena, TX (US)

(72) Inventor: Scott R. Copeland, Pasadena, TX (US)

(*) Notice: Subject to any disclaimer, the term of this patent is extended or adjusted under 35 U.S.C. 154(b) by 0 days.

(21) Appl. No.: 14/030,077

(22) Filed: Sep. 18, 2013

(65) Prior Publication Data

US 2014/0344330 A1  Nov. 20, 2014

Related U.S. Application Data

(60) Provisional application No. 61/839,229, filed on Jun. 25, 2013, provisional application No. 61/708,125, filed on Oct. 1, 2012.

(51) Int. Cl.
*G06F 15/16* (2006.01)
*H04L 29/08* (2006.01)

(52) U.S. Cl.
CPC ............. *H04L 67/18* (2013.01); *H04L 67/22* (2013.01)

(58) Field of Classification Search
CPC .................. H04L 29/08072; H04L 29/06
USPC ......................................................... 709/203
See application file for complete search history.

(56) References Cited

U.S. PATENT DOCUMENTS

| | | | | |
|---|---|---|---|---|
| 6,609,128 B1* | 8/2003 | Underwood | ............ | G06F 9/454 707/610 |
| 7,929,998 B1* | 4/2011 | Edwards | ........... | H04M 1/72522 455/572 |
| 2002/0107795 A1* | 8/2002 | Minear | ................ | G06Q 20/102 705/40 |
| 2003/0084165 A1* | 5/2003 | Kjellberg | ................ | H04L 63/08 709/227 |
| 2003/0121756 A1* | 7/2003 | Copeland et al. | ............ | 198/326 |
| 2004/0054922 A1* | 3/2004 | Hiraga | ................ | G06F 21/6227 726/22 |
| 2004/0203698 A1* | 10/2004 | Comp | ................... | H04W 8/005 455/421 |
| 2006/0059159 A1* | 3/2006 | Truong | ............ | G06F 17/30861 |
| 2007/0078986 A1* | 4/2007 | Ethier | ................ | H04L 65/1069 709/227 |
| 2007/0250348 A1* | 10/2007 | D'Ambrosia | .......... | G06Q 50/22 705/3 |

(Continued)

*Primary Examiner* — Vivek Srivastava
*Assistant Examiner* — Atta Khan
(74) *Attorney, Agent, or Firm* — Sherman D. Pernia

(57) ABSTRACT

Disclosed is a system that adapts a personally portable "smart" communications device to enhance a user's personal security by continuously monitoring an alert function of the device from a remote location during a user initiated "session." The user device is in communications with a remote server, which monitors the alert function and provides: accurate preservation of session data; monitoring of user device ambient conditions; dispatch of emergency services; and notification of third parties. Server software (host application) on the remote server manages communications with user devices. The server collects, processes and stores data; dispenses data according to a rule set, and manages multiple user sessions. User software manages the initiation and conduct of a session and communications with the server. The user and server software in combination provide for establishing, maintaining operations of the system, and databases accessible by the remote server for storage/archiving of system data.

14 Claims, 16 Drawing Sheets

(56) References Cited

U.S. PATENT DOCUMENTS

| | | | | |
|---|---|---|---|---|
| 2008/0205378 A1* | 8/2008 | Wyss | H04L 63/00 | |
| | | | 370/352 | |
| 2008/0243545 A1* | 10/2008 | D'Ambrosia | G06Q 50/22 | |
| | | | 705/2 | |
| 2008/0244704 A1* | 10/2008 | Lotter | G06F 21/552 | |
| | | | 726/3 | |
| 2010/0045667 A1* | 2/2010 | Kornmann | G06F 1/1626 | |
| | | | 345/419 | |
| 2010/0045703 A1* | 2/2010 | Kornmann | G06F 1/1626 | |
| | | | 345/653 | |
| 2010/0053219 A1* | 3/2010 | Kornmann | G06F 1/1626 | |
| | | | 345/653 | |
| 2011/0098087 A1* | 4/2011 | Tseng | G01C 21/265 | |
| | | | 455/557 | |
| 2011/0099316 A1* | 4/2011 | Tseng | G01C 21/265 | |
| | | | 710/304 | |

* cited by examiner

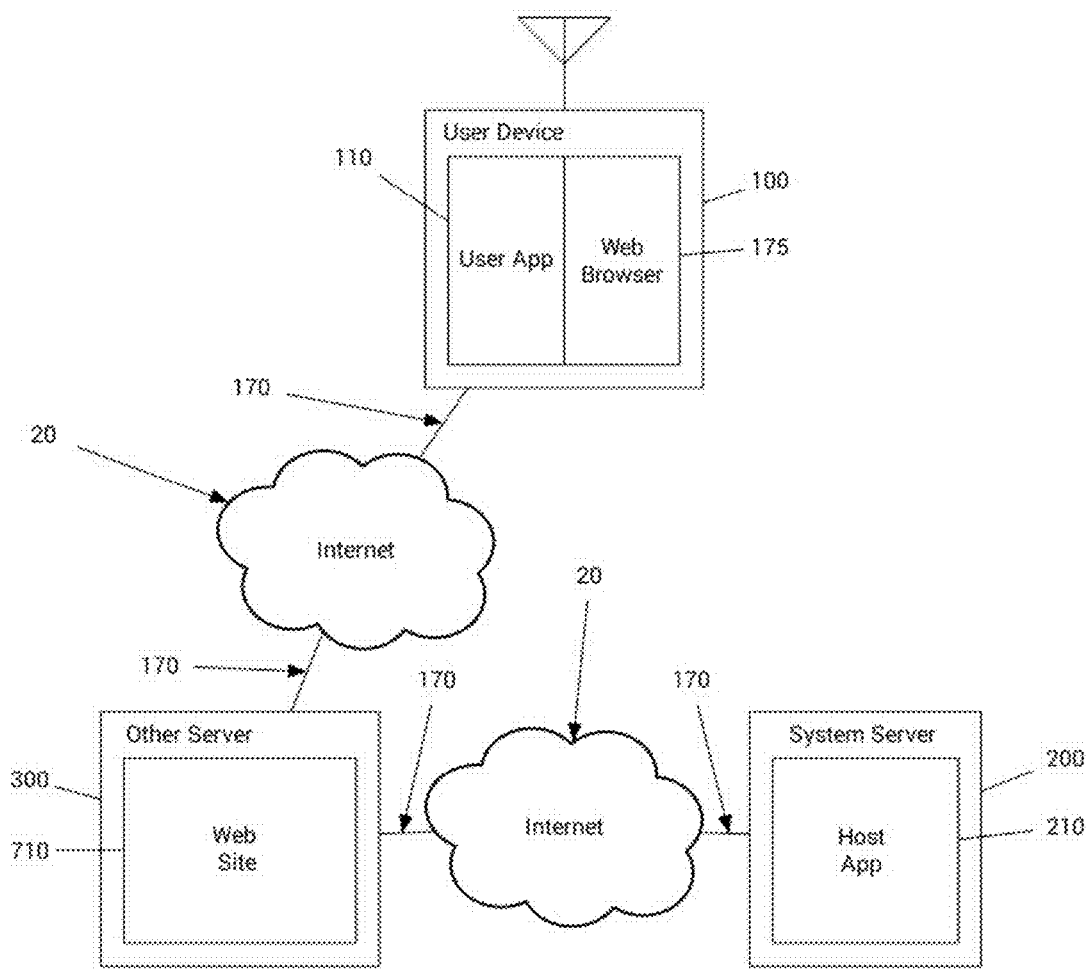

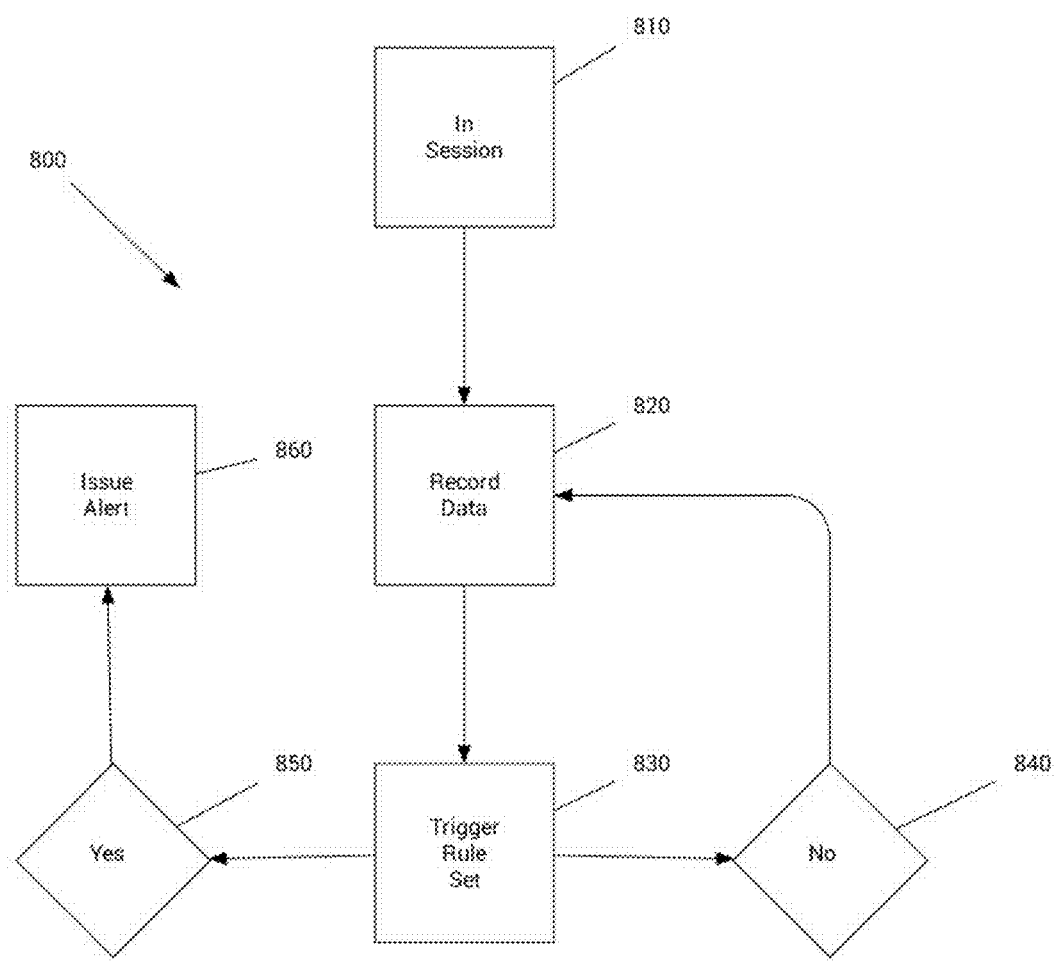

SYSTEM FOR A MONITORED AND RECONSTRUCTIBLE PERSONAL RENDEZVOUS SESSION

CONTINUITY DATA

The present application claims the benefit of prior filed U.S. provisional application Ser. No. 61/708,125 filed 1 Oct. 2012 and Ser. No. 61/839,229 filed 25 Jun. 2013, to which prior applications the present application is a US non-provisional national application.

FIELD OF THE INVENTION

The present invention is in the field of digital data processing systems for processes or apparatus for increasing a system's extension of protection of system data from modification (Class 726) to provide an increased level of personal safety to a user. Specifically, the present invention provides for protection of information and services utilizing security policies, monitoring, scanning data, and countermeasures for the user's personal safety. The subject matter comprises systems and methods, and apparatus that provide for the administration and management of rules or regulations governing the protection of user information and services (subclass 1); the rules governing the format and relative timing of messages exchanged between two communications terminals to prevent unauthorized intrusion or interference (subclass 14). Further, the present invention relates to software and methods for prohibiting any impersonation, unauthorized browsing, falsification or theft of data, or alteration of data not consistent with defined security policy (subclass 26).

SUMMARY OF THE INVENTION

The present invention is a system for conducting a monitored and reconstructible personal rendezvous session. A personal rendezvous session is a meeting between a first user of the present system and another person. The other person does not have to be a user of the system. A session starts when the user initiates it on a user device, i.e., on a "smart," personally portable communications device. A smart, personally portable communications user device for the purpose of this disclosure includes such current personally portable communication devices as: smart phones, computer tablets, notebooks, "wearable electronics" and the like. Such smart devices typically will have: full telephony, geo-location, and ambient environment sensing capabilities to monitor the environment of the user device, as well as data and video/audio recording and transmission capabilities.

During a session, the system tracks the user's location (e.g., via GPS coordinates or triangulation) during the entirety of the session, and also records all system communications of the user. All user photos, GPS coordinates and audio/video communications are remotely stored by the system and preserved to prevent data modification, erasure or tampering. This preservation of a session provides a user of the system with a certifiably accurate forensic history of the session stored by the system as an independent third party. The unmodifiable preservation of session data provides a unique safety feature for a user of the present system when meeting with strangers. Should a problem arise from the meeting during a session, a clear reconstruction of the time line, locations, and persons involved in the session is in the custody of the system and can be made available to the user and to other properly authorized parties. Further, all participants at a meeting knowing that the meeting is being monitored, tracked and remotely recorded by the present system, can discourage inappropriate behavior of meeting participants. Thus, the system provides a user with an additional level of personal security during a rendezvous session.

The purpose of the present system for a monitored and reconstructible personal rendezvous session is to collect session data and send it real time to a remotely located server. The data is time/date stamped and cannot be altered by anyone and cannot be deleted from the server. The session data collected provides an unalterable record (i.e., a "chain-of-evidence" for the session data) of a user's movements and actions while in various settings (i.e. date, meeting someone on Craig's List, etc.). Should the need arise the user or an emergency contact can download the session data collected in a format which can be used by police, emergency responders, or even in court, because the data cannot be directly accessed or altered once it has been recorded by the server. By keeping the data in a neutral party location (the system server) and not allowing the data to be altered, the data can provide a clear unbiased picture of the events of a 'Meeting' recorded by the present system.

BRIEF DESCRIPTION OF THE DRAWINGS

FIGS. 9A & 9B are diagrams illustrating the retrieval of session data by a website request to a remote server (A) hosting the session data, or by the website request to a local or shared server (B) hosting the session data.

FIG. 10A is a flowchart illustrating the server software of the system triggering an alert based on a rule set in response to data generated by the user device and transmitted to the system server during a session.

DETAILED DESCRIPTION OF THE INVENTION

Figure 1:
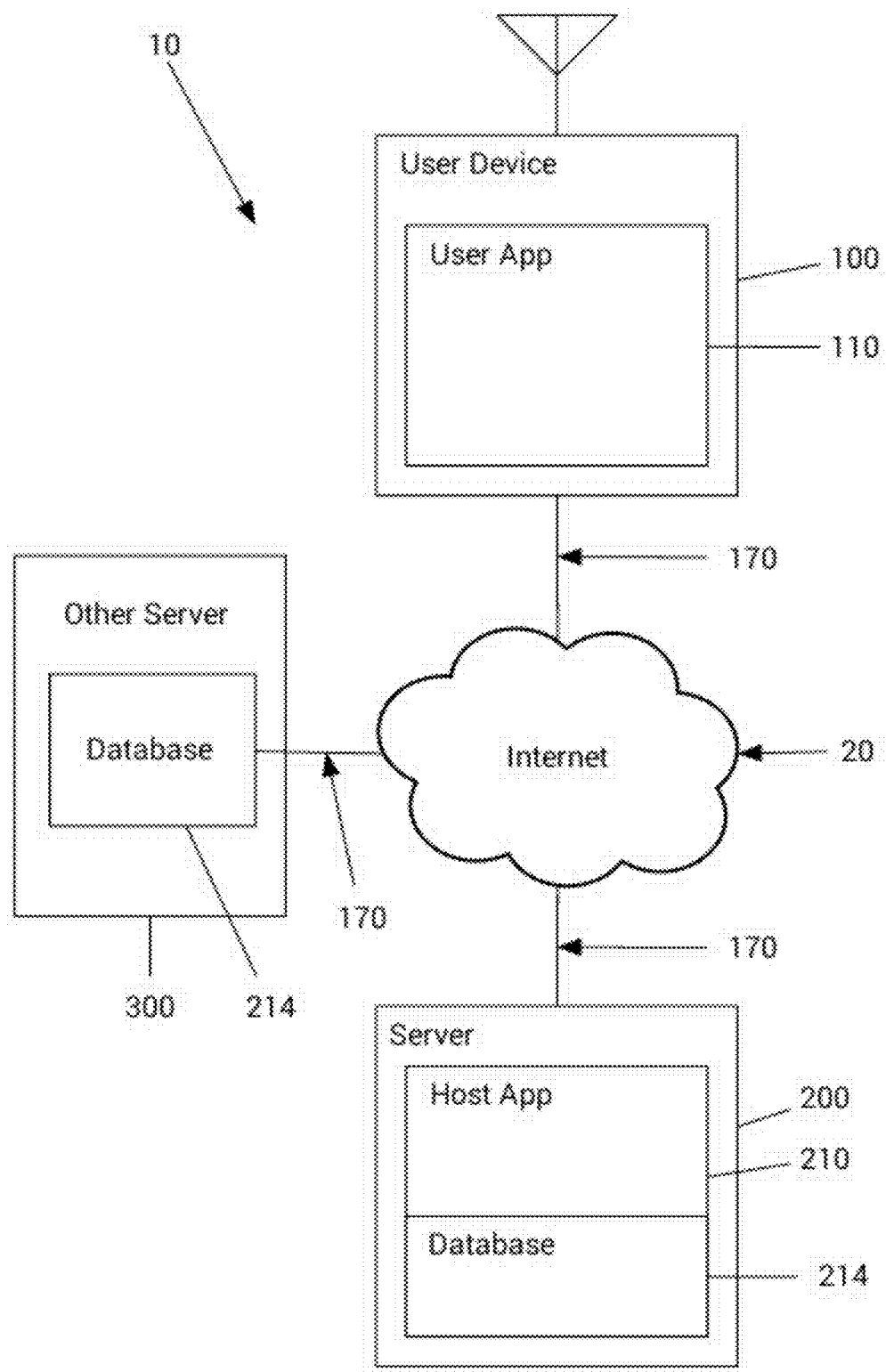
FIG. 1 is a schematic diagram illustrating an overview of the system.

Referring now to the drawings, the details of preferred embodiments of the present invention are graphically and schematically illustrated. Like elements in the drawings are represented by like numbers, and any similar elements are represented by like numbers with a different lower case letter suffix.

As shown in the figures, the present invention is a system 10 of hardware and software that provides a means of promoting personal security by monitoring an alert function of a personally portable user device 100, which function is monitored continuously during a user initiated "session" 30 (see FIG. 3) by a server system 200 at a remote location. The remote server system 200, which provides for: the accurate preservation of session data; the monitoring of user device ambient conditions; dispatch of emergency public health and security services; and the notification of third parties. As illustrated in FIG. 1, the present system 10 comprises at least one user device 100, in communications with a remote server 200. It is anticipated that in practice, the system 10 will comprise a plurality of user devices 100. User software (user application) resides on the user device 100 and provides for the operations of the present system 10 on the user device 100, and a user's ability to interact with the system 10. Server software (host application) 210 resides on the remote server 200 and manages communications with user devices 100 via a global computer network 20 (i.e., the Internet). The host application 200 collects, aggregates, processes and stores data; dispenses data according to a rule set, and manages multiple user sessions. User device software 110 resident on the user device 100, manages the initiation and conduct of a session and communications with the server 200. The user device software 110 in combination with the server (or host application) software 210 provides for establishing and maintaining operations of the system 10. One or more databases 214 are accessible by the remote server 200 for storage and/or archiving of system data.

The user device 100 is adapted to store and to execute the user device software instruction set (user application) 110. The user device 100 is in communication with the server 200 via the network connection 170 to a global computing network 20 (the Internet). A user device 100 can be any personally portable communications device capable of full telephony, geo-location, and ambient environment sensing, as well as data and video/audio recording and transmission, such as: "smart" phones, computer tablets and notebooks, and the like, and wearable electronics in conjunction with such devices (e.g., a WiFi linked video camera).

It is intended that a user device 100 be any personally portable or mobile device having enhanced computing/communications capabilities. The user device software 110 is adapted to provide a number of functions integral to the practice of the present system 10. For example, user device software is adapted to determine and to transmit or record the location of the user device 100. The user device software 110 date/time stamps all user device communications made in the context of the system 10. This includes user device generated data, user device operational status (including battery condition/life) to be communicated to the server. Additionally, upon loss of communication with the server 200, the device software 110 is adapted to cache these data for later transmission upon regaining connectivity with the server 200. These latter transmitted data are date/time stamped upon their initial generation and again upon their later transmission to the server 200.

All outgoing communications from the user device 100 are either: sent to the server 200 first before a copy is sent out directly (e.g., to a social media service, like Twitter™), or pass through the server 200 for date/time stamping and recordation before being sent on to their ultimate destination.

The server system (or server) 200 as practiced in the present system 10 for a monitored and reconstructible personal rendezvous session can be accomplished using any of a number of means known to the ordinary skilled artisan. These include: a personal computer; a mainframe computer, a computer array, and a "cloud"-based computing system on a global computer network. The server 200 executes the server software 210 collects, aggregates, stores and communicates data to and from a plurality user devices 100. The server 200 also records and stores all communications between the user devices 100 on the system 10 and the server 200, including user communications that are passed through or passed on by the server 200. In fact, in the context of a session 30, all user device communications must be sent first to the server 200 or pass through the server 200 to be recorded as provided for by the server software 210. For example, a social media communication initiated by a user during a session 30 will be time/date stamped and communicated to the server system 200 before it is communicated to the particular social media provider.

The server software 210 provides for managing the operations and processes of the system 10 on the server 200, including administrative processes and data management. Additionally, the server software 210 manages (and records) data and other communications between itself and a user device 100, and between a user device 100 and any third party (this latter within the context of a session 30), as well as between two or more other user devices 100 on the system 10.

The rule set of the server (or intermediary) software 210 provides for output of user data in response to an "in-case-of-emergency" (ICE) function in response to an ICE contact query according to a set of emergency and contact parameters of user established ICE rules. Aspects of the ICE functions of the rule set can also be initiated under administratively established parameters of the rule set as provided by the server software 210.

Figure 2:
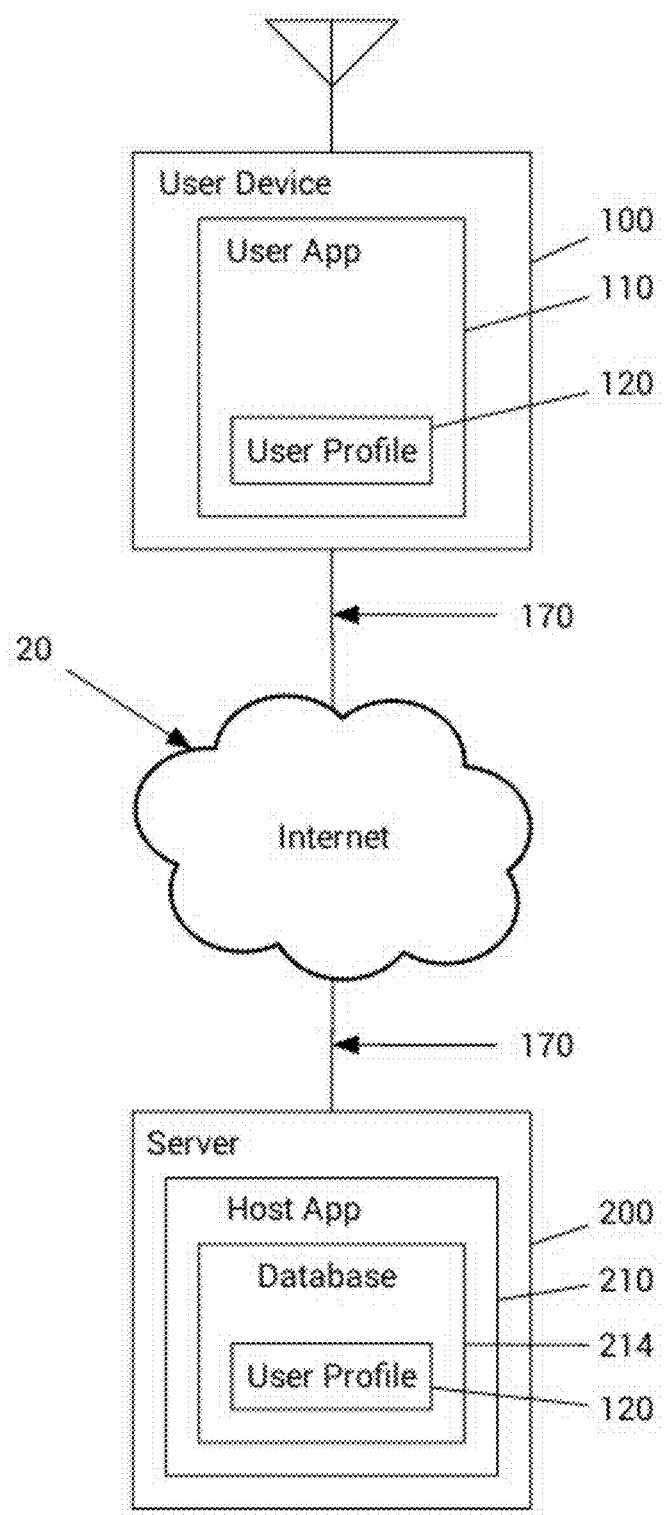
FIG. 2 is a schematic diagram illustrating the establishment of a user profile for a user of the system.

As shown in FIG. 2, in practicing the present system 10, the user software 110 is downloaded or otherwise installed onto an appropriate user device 100. The server software (host application) 210 is installed on a server system 200 in communication 170 with the user device 100 via a global computer network (Internet) 20. A user of the system 10 loads his/her user profile data 120 onto the user device 100, which profile data is communicated to the host application (server software) 210. In a preferred embodiment, the system 10 does not have access to any actual personally identifying information of a user. A user profile is intended to include such non-personally identifying indicia such as a pseudonym for the user, a passcode for the user account and an "In Case of Emergency" (ICE) email contact. This feature is important to maintain the privacy of a user, because the system may contain images, communications and the like that are personal to and may be the property of that user. Should a compromise of the server system 200 occur, there is no link to the stored data and the person of a user. Therefore, for example, a stored user session cannot be identified to the specific person and be altered or deleted.

This is a feature that serves to preserve the "chain-of-evidence" aspect of the system 10.

Figure 3A:
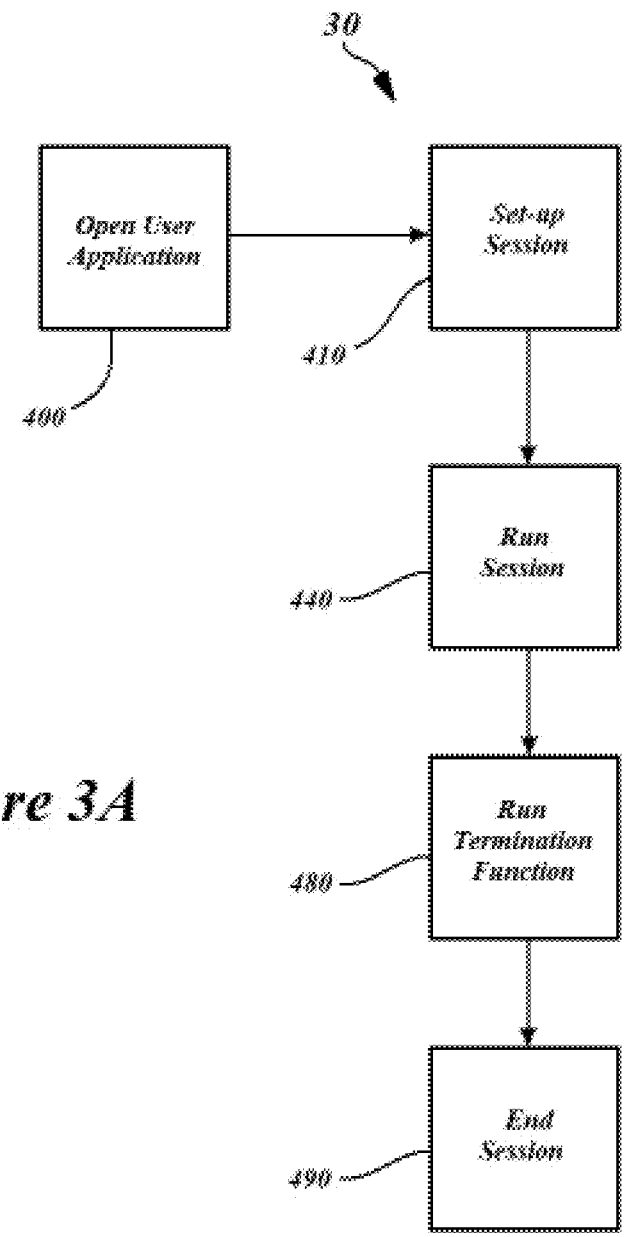
FIG. 3A illustrates a set of typical process components of a session.

FIG. 3A illustrates a set of typical process components of a session 30. As used herein, a session on the present system 10 is defined as: a function of the system wherein the user device 100 collects, time/date stamps and records various data and in real-time (or near real-time), and transmits the stamped data to the system server 200 for read-only storage and/or other processing. The benefit of this is to provide a verifiable version of the session can later be reconstruction from the stamped data. The session 30 includes a set-up process 410, a run process 440, a terminate process 480 and an end process 490. At an Open Application 400 function presented on the user device 100 by the user software 100, a user selects to enter the application of the present system 10. The user software 110 then presents an opening (or "Home") GUI which enables a user to select between a number of process options of the present system 10, including to initiate/set-up of a session 30. Other process or function options of the system 10 that may be presented include: an Emergency Imaging function, a System Message 60 function, a Collision Detection 80 function, an ICE function, etc.

Figure 6:
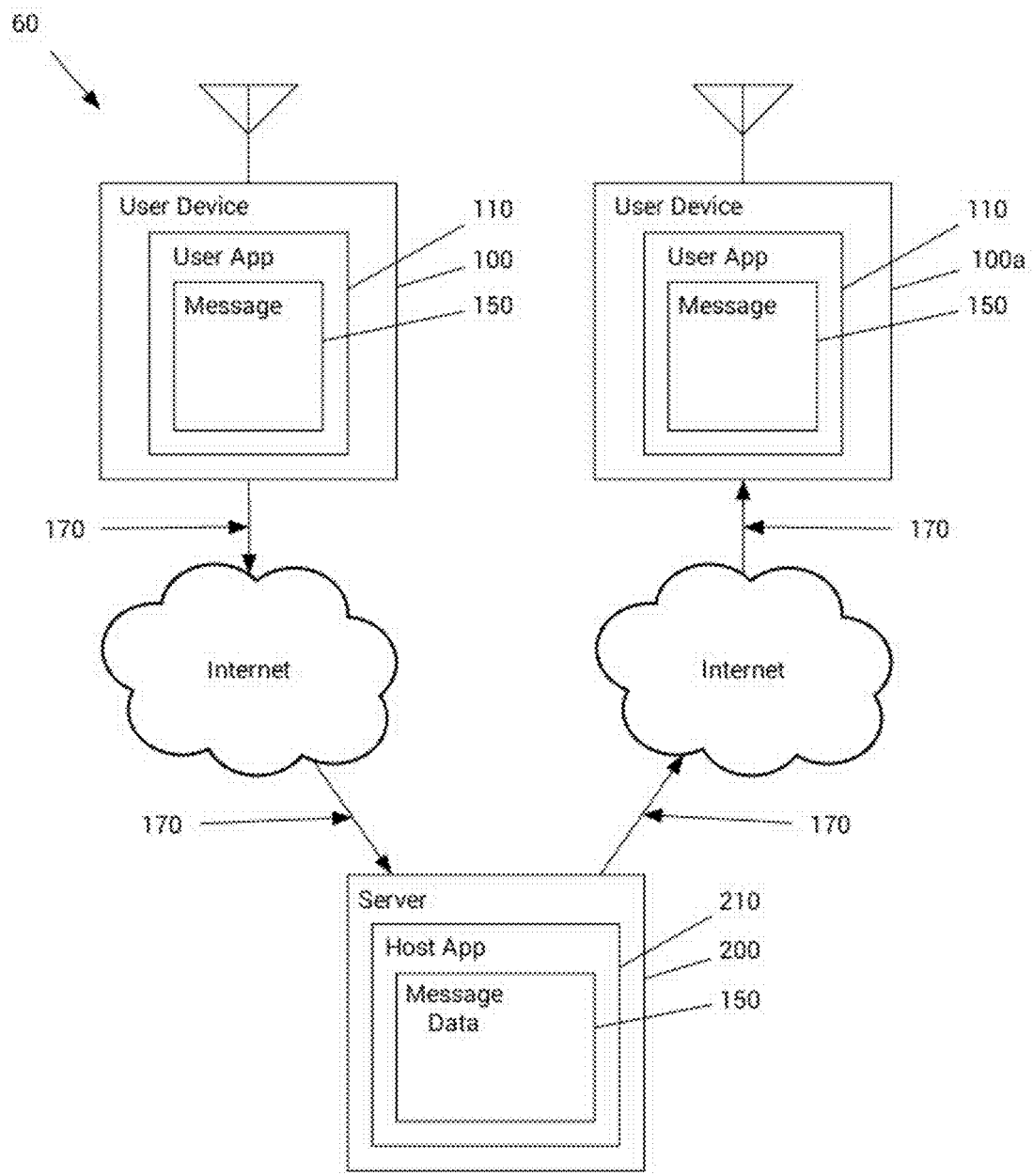
FIG. 6 is a schematic diagram illustrating the present system's session participant messaging system.

The Emergency Imaging function is adapted so that when a user activates the function, (on a user device so equipped) the camera feature of the user device 100 is (rear) should be activated and the image displayed on the screen of the device. The user can touch anywhere on the screen and a photo will be taken. The photo is time/date stamped and stored on the user device 100 and immediately transmitted to the system server 200. The present system 10 includes means for the user device 100 to communicate via the Messaging 60 function with another user device 100a either within a session 30 or outside of a session. As exemplified in FIG. 6, the Messaging 60 function is a closed communication system in that all the transmissions are time/date stamped and processed through the system server 200.

Figure 3B:
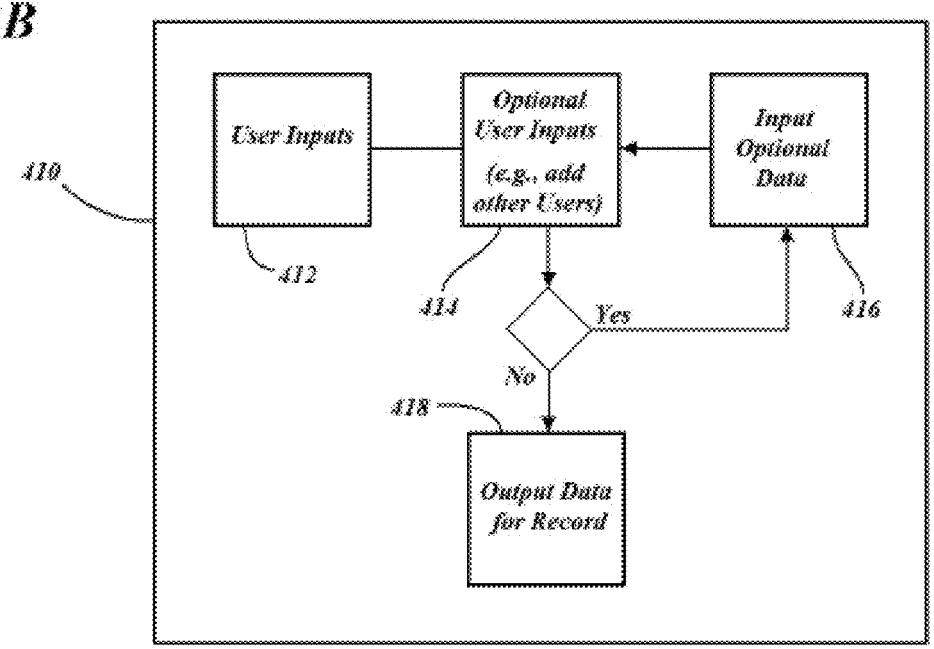
FIG. 3B illustrates an example of a session Setup process during which the user can select (for example) to include other parties' user devices.

As illustrated in FIG. 3B, a session 30 can be setup once the user has activated the application of the user software 110 on the user device 100. The user software 110 communicates with the server software 210 and links the user's profile data 120 to the session 30. During the Session Set-up process 410, a user inputs appropriate user data as prompted by the user software 110, which also communicates the user data to and receives instructions from the server software 210 in order to initiate the session 30. As exemplified in the figure, a part of the Session Set-up process 410 is to enable a user to select whether to include other parties (who's user devices 100 are enabled with the present system 10) to participate in the session 30.

Figure 3C:
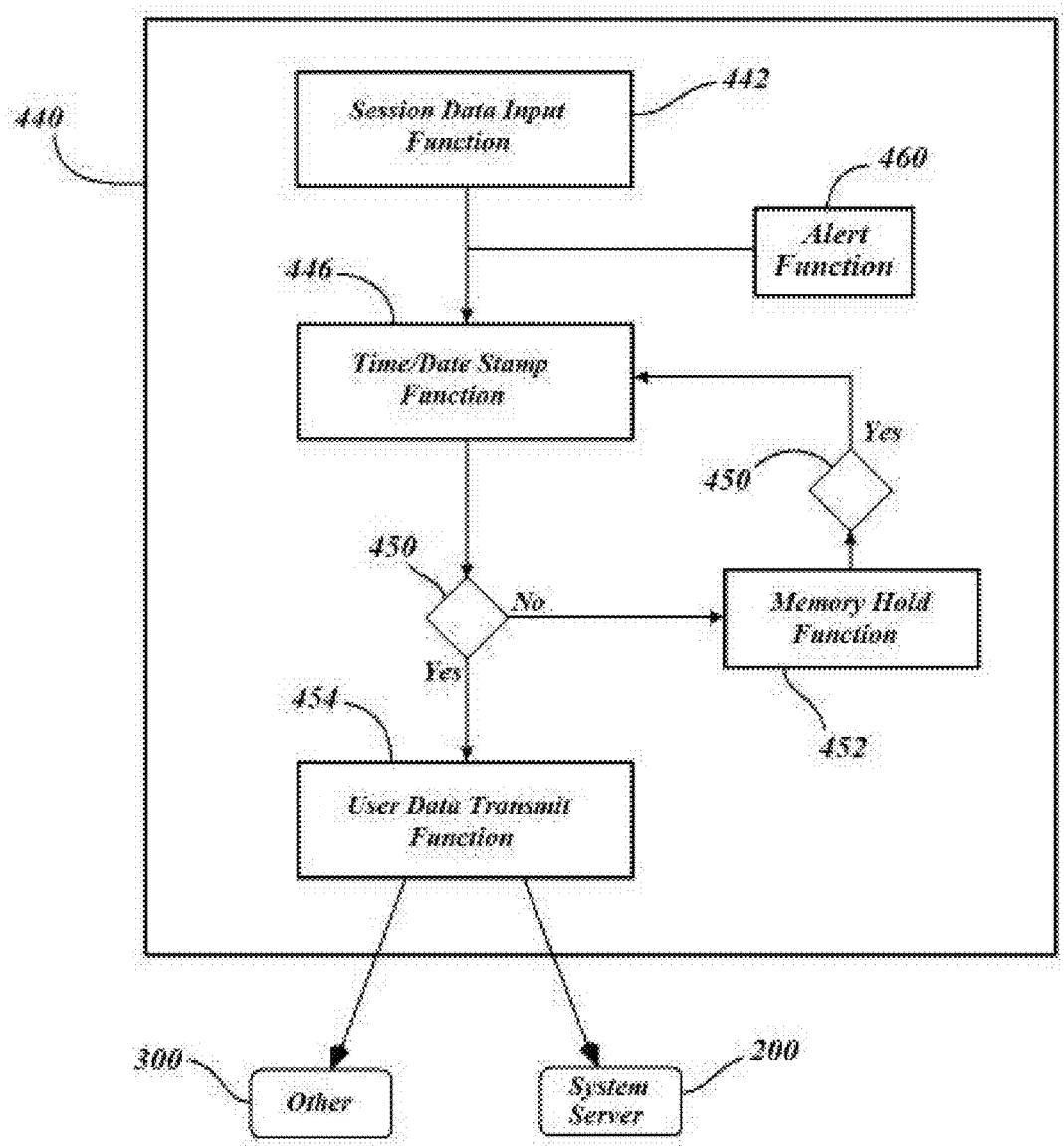
FIG. 3C illustrates that during the Run Session process, any user data input to or generated by the user device during a session goes through a Time/Date Stamp function.

After the Session Set-up 410 function of a session 30 has been initially accomplished, the session enters the Run Session 440 function of the session 30, see FIG. 3C. During the Run Session 440 process, the present system 10 is in continuous operation. During the Run Session 440 process, any user data input to or generated by the user device 100 (within the context of the session 30) goes through a Time/Date Stamp 446 function. That is, upon its recording, any data input to or generated by the user device 100 is time/date stamped. Additionally, upon being transmitted to the System Server 200, the recording is time/date stamped again, and then transmitted. Such user data inputs include: user social media communications, image data, audio data, etc. Such user device 100 generated data include: user device location, battery state, ambient environment monitoring data, images, QR codes, messages, and generally, any other data generated by the user device 100 during the operation of the present system 10. (Note: these and other data generated by the user device 100 during operation of the present system 10 may also be time/date stamped and stored and/or transmitted to the system server 200.)

If any data generated in the context of a session 30 is to be transmitted to Other 456 destinations outside of the present system 10, it is first transmitted to the system server 200 and then a copy of it is transmitted to the Other 456 destination.

Figure 4:
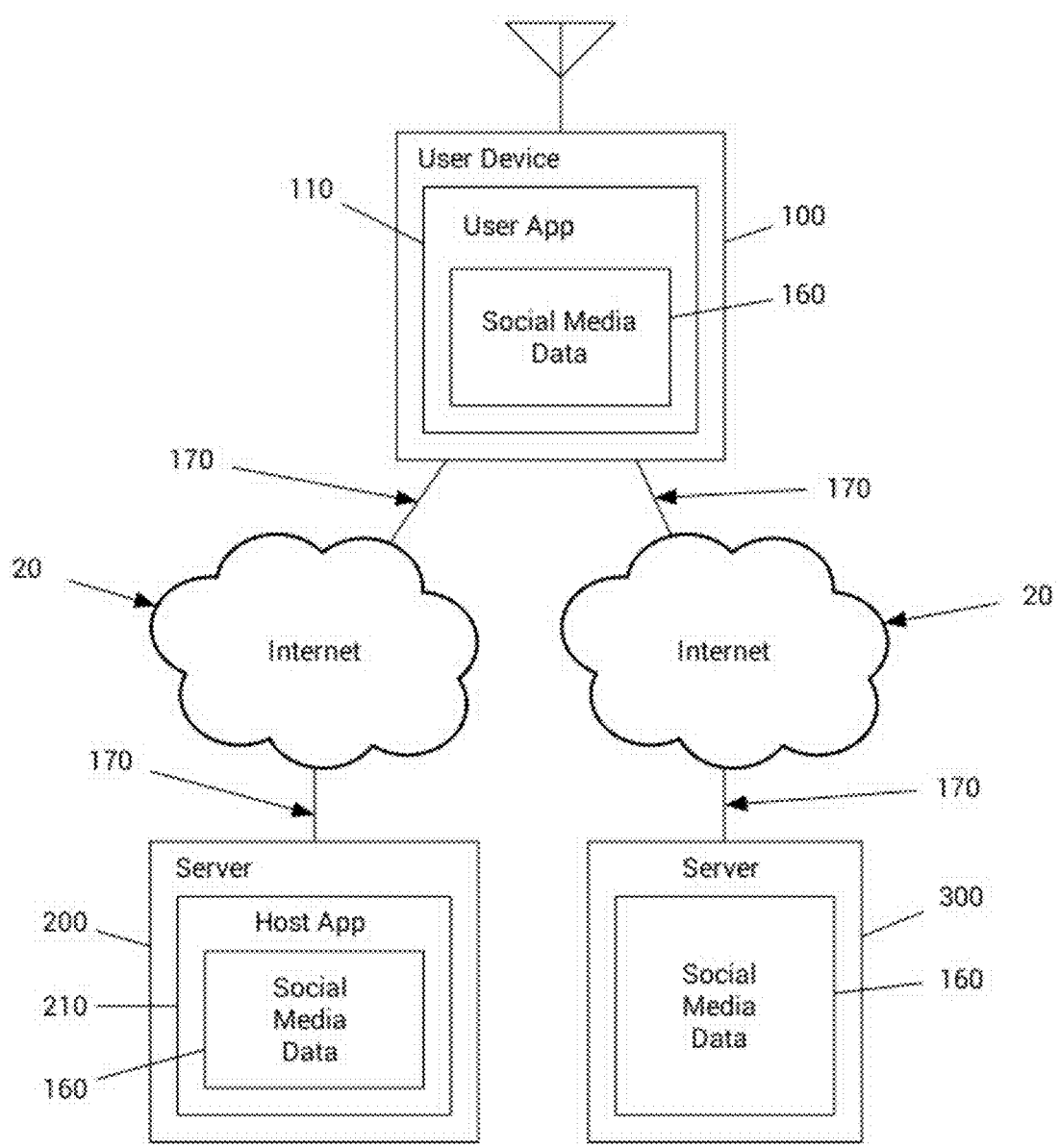
FIG. 4 is a schematic diagram illustrating the user device issuing a social media update to the system server and a third party server.

FIG. 4 illustrates how the present system 10 handles a communication sent to a third party 300 (i.e., a party that is not participating in the session), which communication is sent within the context of a session 30. As noted above, all communications from the user device 100 in the context of a session are sent to the host application 210 on the system server 200. If a particular communication is to be sent to a third party 300 (e.g., a social media service in the illustrated example), the communication is first Time/Date stamped and sent to the system server 200, before a copy is sent to the third party 300. No communication received by the user device 100 from an Other 300 application or process interacts with or is handled by the present system 10 during its operation, except that general status notices of the user device operating system are permitted to be displayed.

Figure 7:
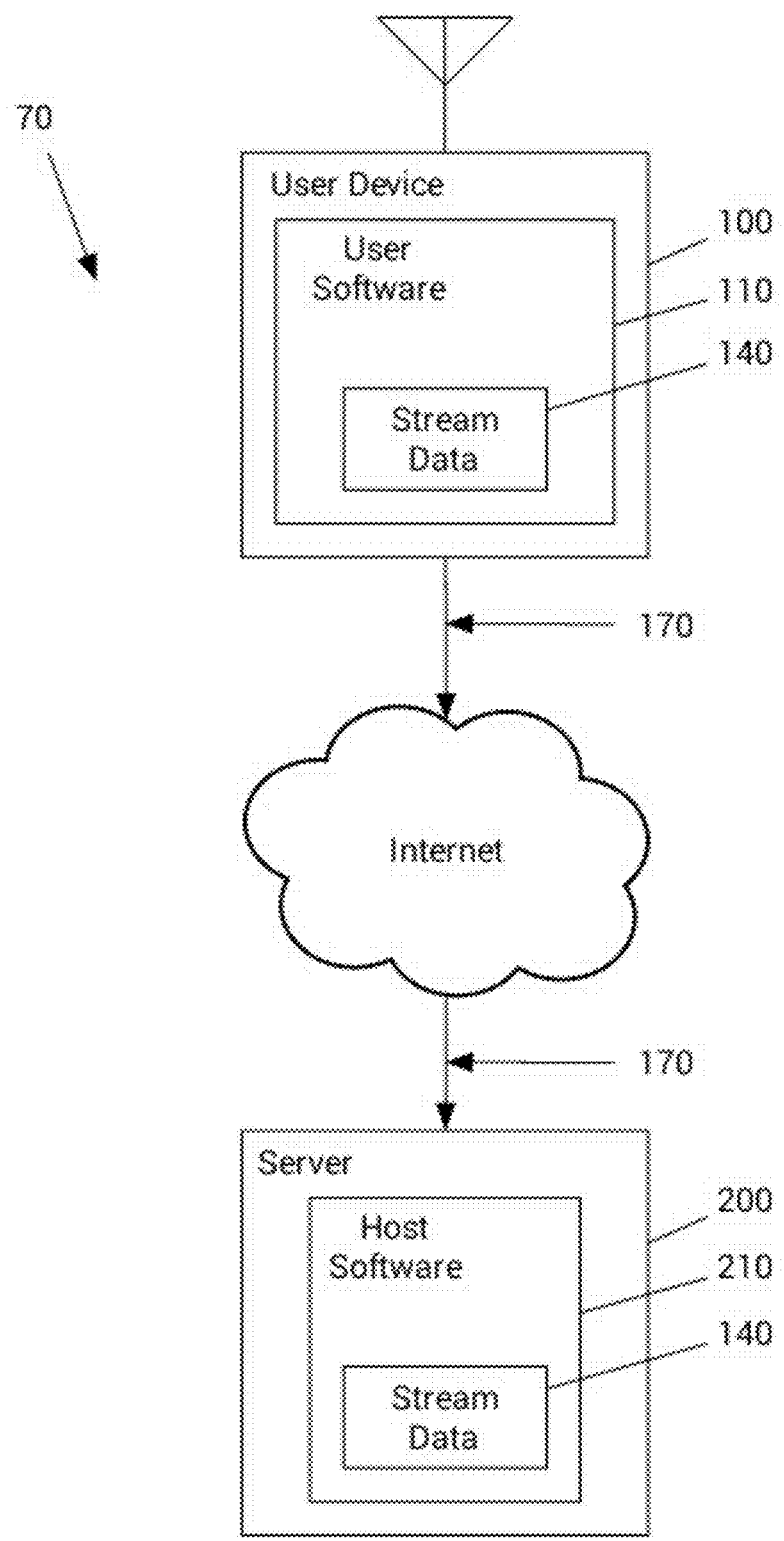
FIG. 7 is a schematic diagram illustrating the user device sending an audio/video stream to the system server.

As shown in FIG. 7, a user device 100 of the present system 10 can send time/date stamped data including an audio/video stream 140 to the system server 200 to be recorded by the system software 210 in the system database 214. As noted above, the collected time/date stamped data provides an unalterable record (i.e., a "chain-of-evidence" for the collected data) of a user's movements and actions while in various situations. Should the need arise, the user or an emergency contact can download the collected time/date stamped data, which can be used by police, emergency responders, or even in court, because the time/date stamped data cannot be directly accessed or altered once it has been recorded by the server. By keeping the data in a neutral party location (the system server 200) and not allowing the data to be altered, the data can provide a clear unbiased picture of the events recorded.

Figure 5:
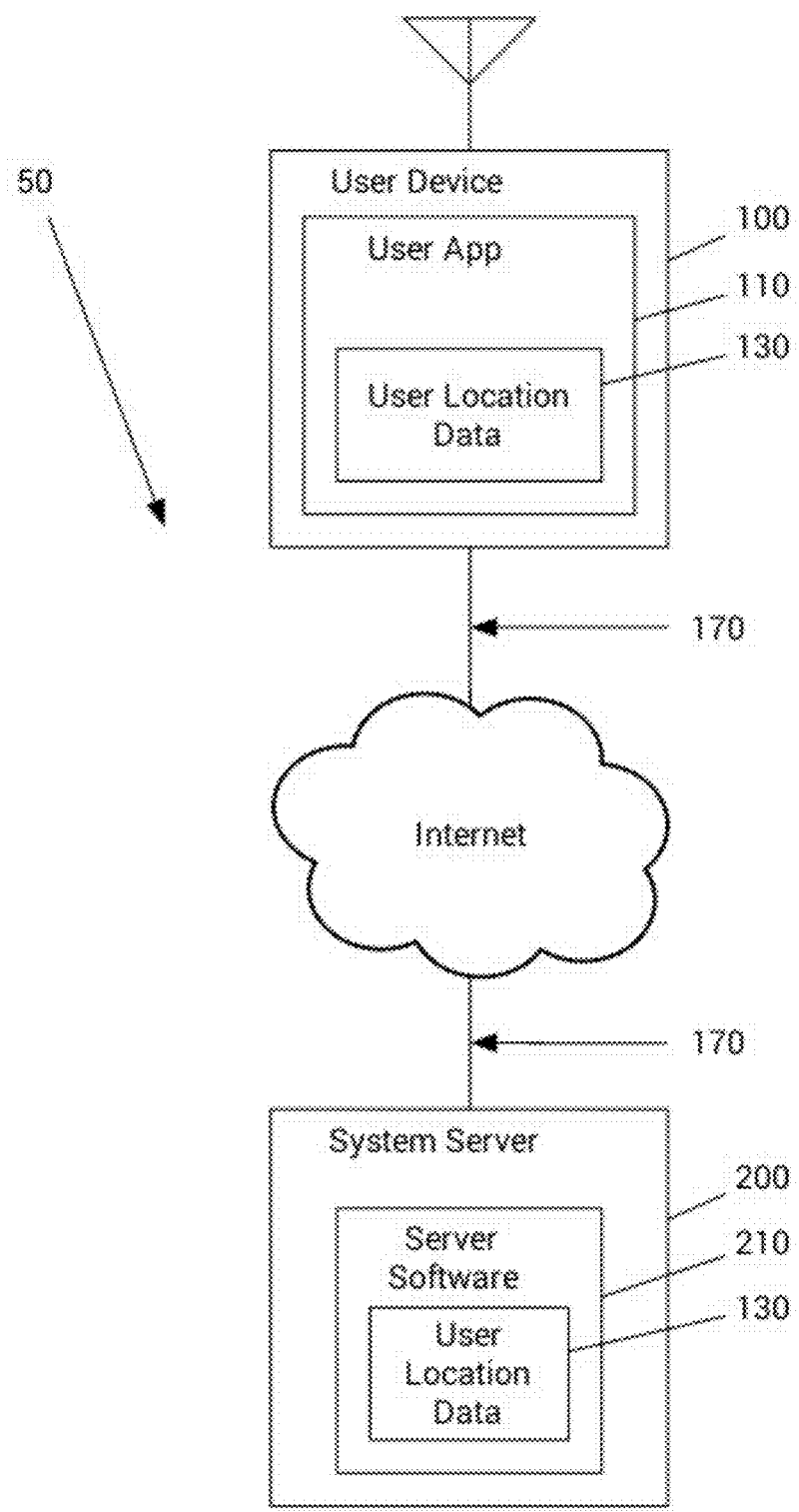
FIG. 5 is a schematic diagram illustrating the user device updating the system server with its current location data.

The Connectivity 450 function monitors the user device's connectivity state, and determines if there is sufficient connectivity to transmit date/time stamped data that is to be outputted from the user device 100. If the Connectivity 450 function determines that there is insufficient connectivity to transmit the out going data, the outgoing data is routed to memory and held by the Memory Hold 452 function until the connectivity function determines that sufficient connectivity has been reacquired by the user device 100. Upon re-establishment of sufficient connectivity, the Memory Hold 452 function sends the previously held data to the Time/Date Stamp 446 function to be additionally date/time stamped before again attempting to transmit the data via the User Data Transmit 454 function. For example, FIG. 5 illustrates the user device 100 generating (and Time/Date Stamping) user device location data 130, and updating the system server software 210 with the current user device location data 130. If the Connectivity 450 function determines that there is insufficient connectivity to make a transmission of the data 130, the location data 130 will be store by the Hold Memory 452 function. After connectivity is reacquired, the Memory Hold 452 function will send the previously time/date stamped user device location data 130 to the Time/Date Stamp 446 function to be additionally time/date stamped. Then the user device location data 130, including both any previous and the additional time/date stamps, will attempted to be transmitted by the Run Session 440 function.

The Date/Time Stamp 446 feature of the Run Session 440 function of a session 30 is important to the impartial "chain of evidence" benefit of the present system. The time/date stamped session data cannot be altered by anyone and cannot be deleted from the server 200 by a user. The session data collected provides an unalterable record (i.e., a "chain-of-evidence" for the session data) of a user's movements and actions within the context of a session 30. Should the need arise the user or an emergency contact can download the collected session data. The session data can be trusted for what it is when used by police, emergency responders, or even in court, because the data cannot be directly accessed or altered once it has been time/date stamped and recorded by the server 200. By keeping the data in a neutral party location (the system server 200) and not allowing the data to be altered, the data can provide a clear unbiased picture of the events of a 'Meeting' recorded by the present system.

When the session 30 is over and the user desires to terminate the session 30, he/she initiates the Run Termination 480 function of the user device software 110. See FIG. 3A. The Run Termination 480 function ends the input of data by the user and starts the End Session 490 function. This means that the user can no longer input data into the session, but that certain user device generated inputs are still active and transmitted to the system server 200, such as user device location data, battery status and signal strength. The End Session 490 function starts and runs a timer function of a predetermined time duration, during the running of which, the server software 210 continues to receive, process and store the date/time stamped user device generated data from the user device 100.

Figure 10B:
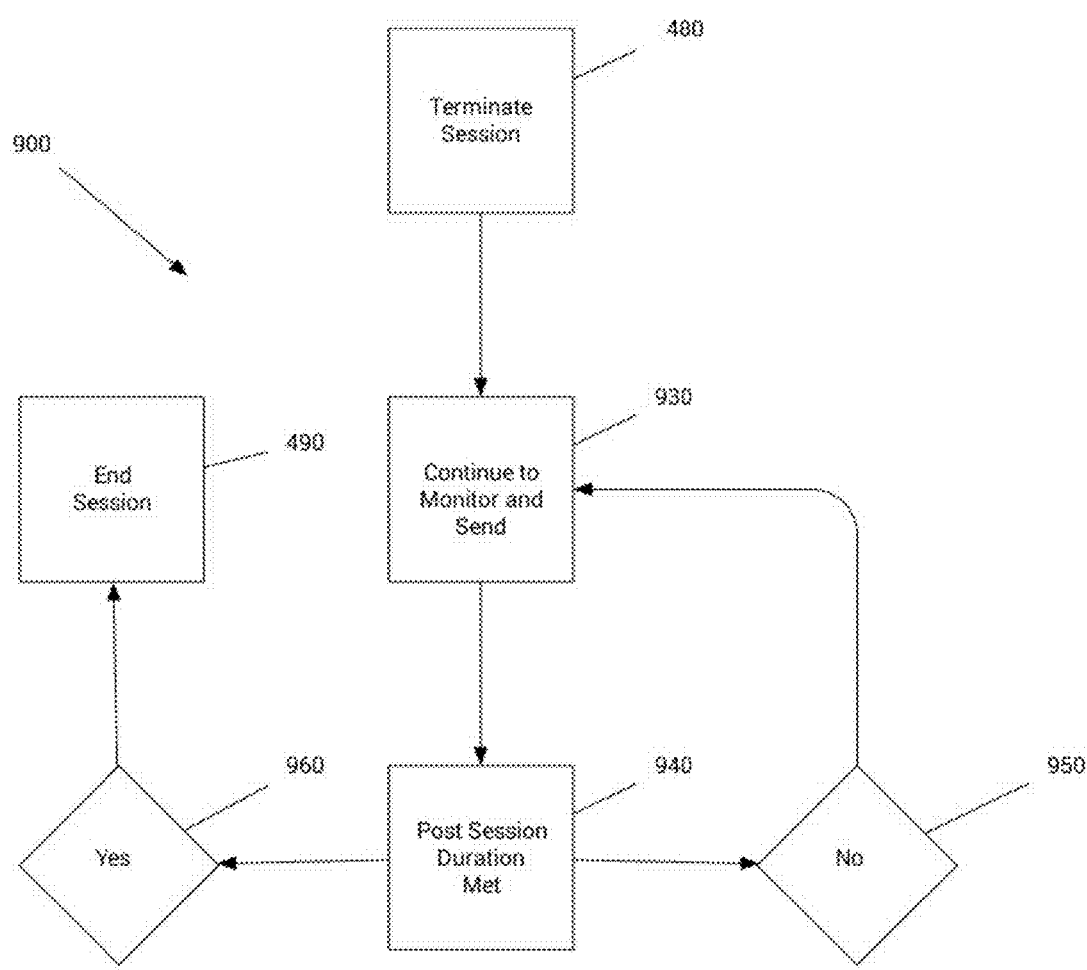
FIG. 10B is a flowchart illustrating the system server continuing to record data received from the user device for a period of time (as determined by a rule set) after the server has received a session termination request from the user device.

See FIG. 10B illustrating session termination process 900, wherein the Monitor and Send 930 function of the user device software 100 continues to collect and transmit certain data to the system server 200 for a period of time determined by a user device software rule set (e.g., a timer function) after the user device 100 has sent the request for session termination 480 to the server 200. When the Post Session Duration Met 940 timer function is satisfied, the user device 100 stops transmitting the user device generated data to the system server 200, and the End Session 490 function is accomplished at the user device 100. That is, the End Session 490 function on the user device 100, causes the user device 100 to cease collecting and transmitting device data generated in the context of the session 30, and ends the session 30.

An important feature of the present system is that, in the course of a session 30, 60, the system 10 will send out an alert as dictated by a rule set of the user and system softwares. An alert transmission can be initiated at either the user device 100 or the system server 200. FIG. 10A as an example shows a user device 100 triggering an alert function 800 (based on the rule set) in response to data locally collected and recorded 820 during a session 30. The locally collected and recorded data 820 is assess by the user device software in view of the rule set function 830. If the data assessment results in positive result 850 of the trigger rule set 830 function, then the user device 100 activates the issue alert 860 function, an alert communication/signal is transmitted by the user device 100. Otherwise, absent a positive result 840, the device continues to collect and/or record data 820.

Figure 8:
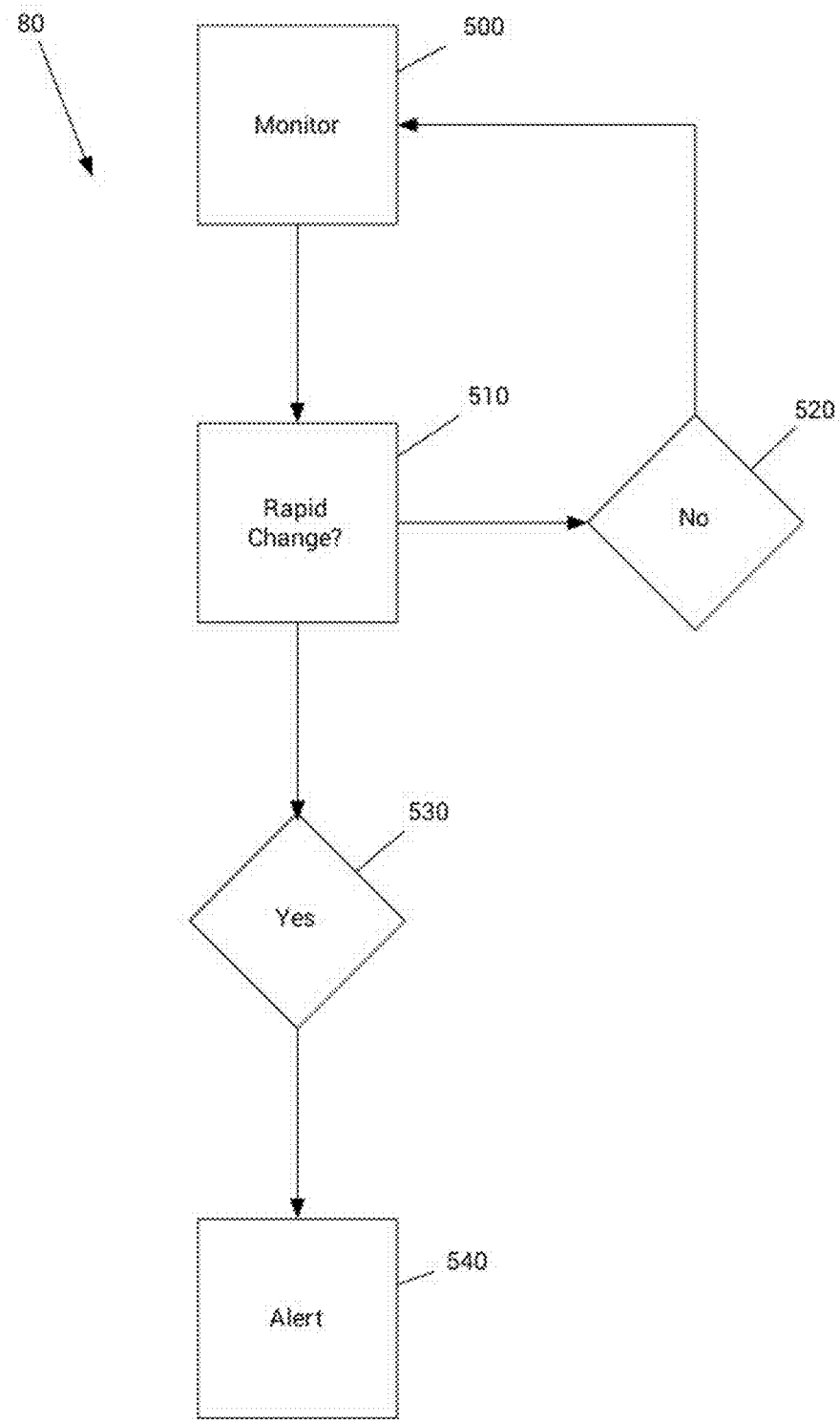
FIG. 8 is a flowchart illustrating the logic for a collision detection system.

Additionally, as an optional embodiment of the present system's monitoring of the ambient environment of a user device 100, the present system 10 can include a Collision Detection 80 function. See FIG. 8. A portion of the Collision Detection 80 function is resident on a user device 100 equipped with accelerometer, gyroscope and/or magnetometer capabilities. The Collision Detection 80 function monitors these capabilities to detect rapid changes indicative of a collision based upon a rule set of the user software 110. On indication of a collision, the user software 110 of the user device 100 alerts the system server 200 of a collision detection, including the last location of user device 100. The system software 210 of the server 200 then responds to the alert with the appropriate prescribed protocol.

Figure 9B:
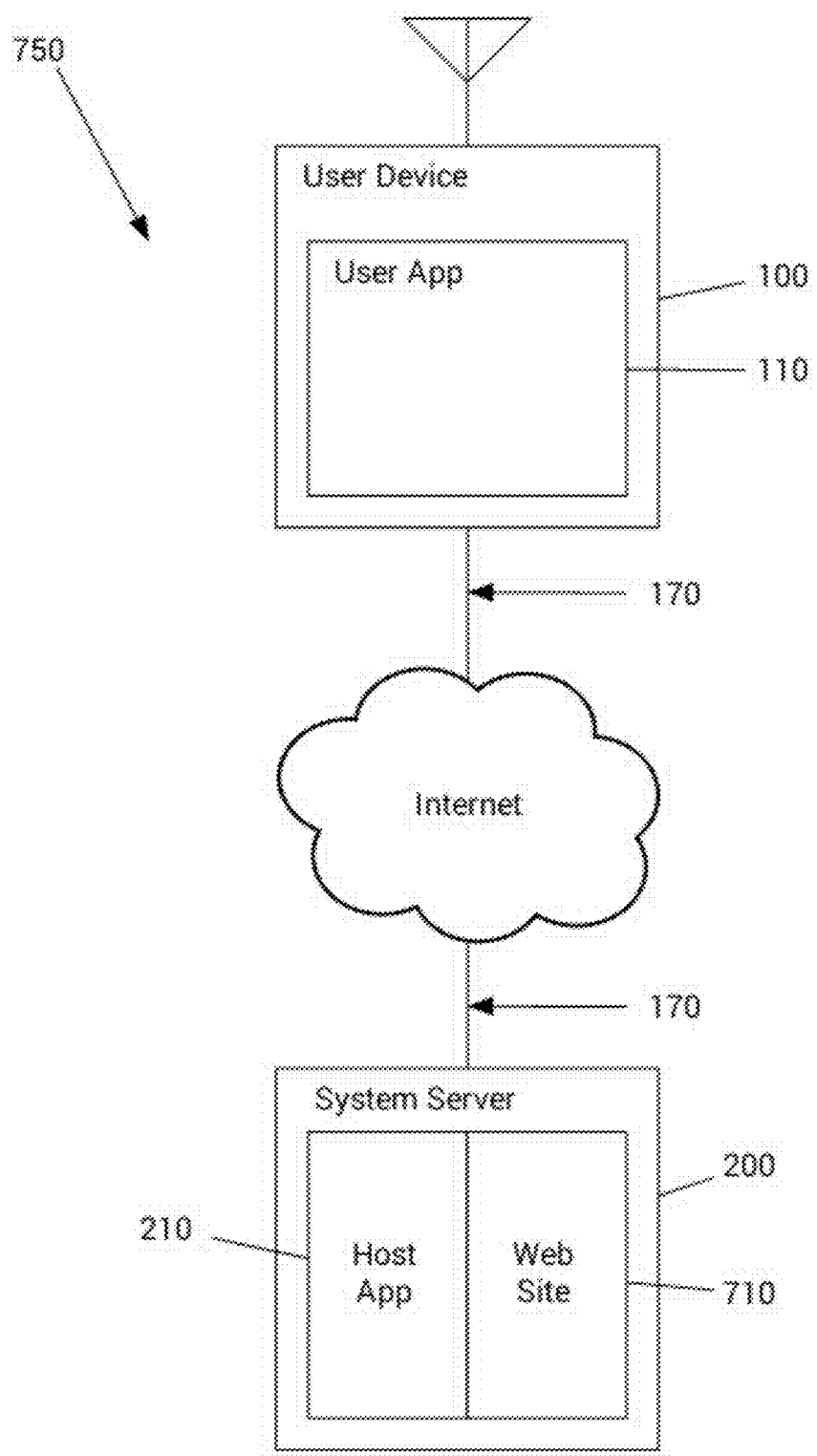

If a user wishes to retrieve data from a session 30, the user can access a copy of all or a part of the session data from a read only session data file on the system server 200. The read only session data file is accessed via a system website using a web browser application. FIGS. 9A & 9B illustrate how a user retrieves session and other user accessible copies of data via (A) a website access to an other's remote server 300 hosting the website, or alternatively via (B) a website hosted on a system server 200 of the present system 10.

Figure 11A:
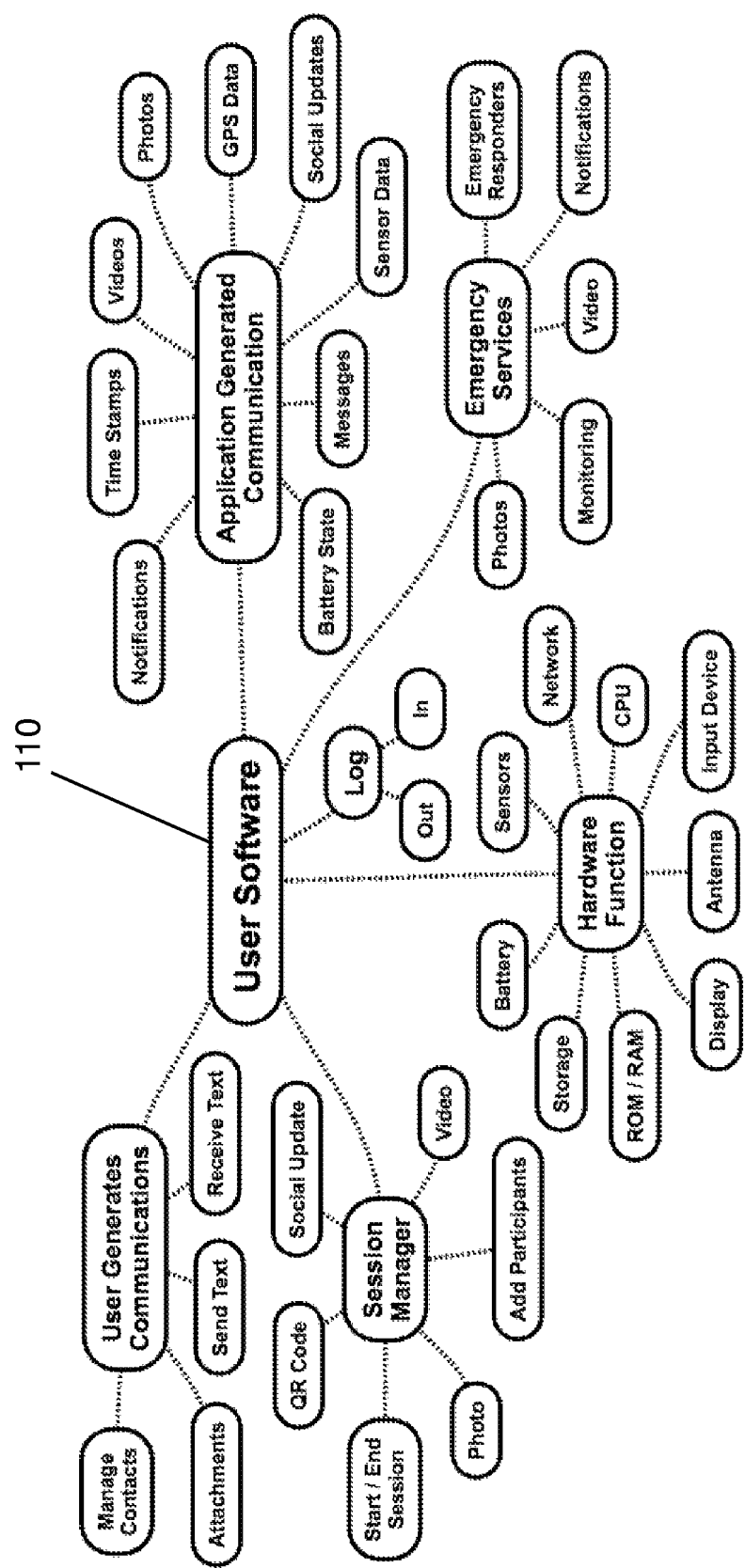
FIG. 11A illustrates the functionality of the user software resident on a user device.

FIG. 11A is an illustration of the functionality of the user software 110 resident on a user device 100. The main features of the user device software 110 are: the Log functions 115, User Generated Communications functions 120, Session Manager functions 130, Hardware Management functions 140, Emergency Services functions 150, and General Application Communications functions 160.

The Log 115 feature of the user software 110 gives the user the ability to log in or out of the application of the present system 10 on a user device 100. The User Generated Communications 120 feature of the user software 110 is adapted to provide a fully functional messaging capability within the context of the present system's 10 operations. The Session Manager 130 provides and manages the functional options the present system 10 presents to the user during a session 30. The Hardware Management 140 feature provides for and manages the necessary functional interactions between the present system on a user device and other hardware and software applications with which the user device interacts. It is to be noted that the listings in the figure are not meant to be exhaustive nor inclusive. The Emergency Services 150 feature includes various options the user software 110 can activate and or utilize in emergency or in other situations, as dictated by a user action or by a rule set of the user software 110. The Application Generated Communications 160 feature of the user software 110 provides for and manages data the present system 10 generates on the user device 100, which is then sent to the server for further action.

Figure 11B:
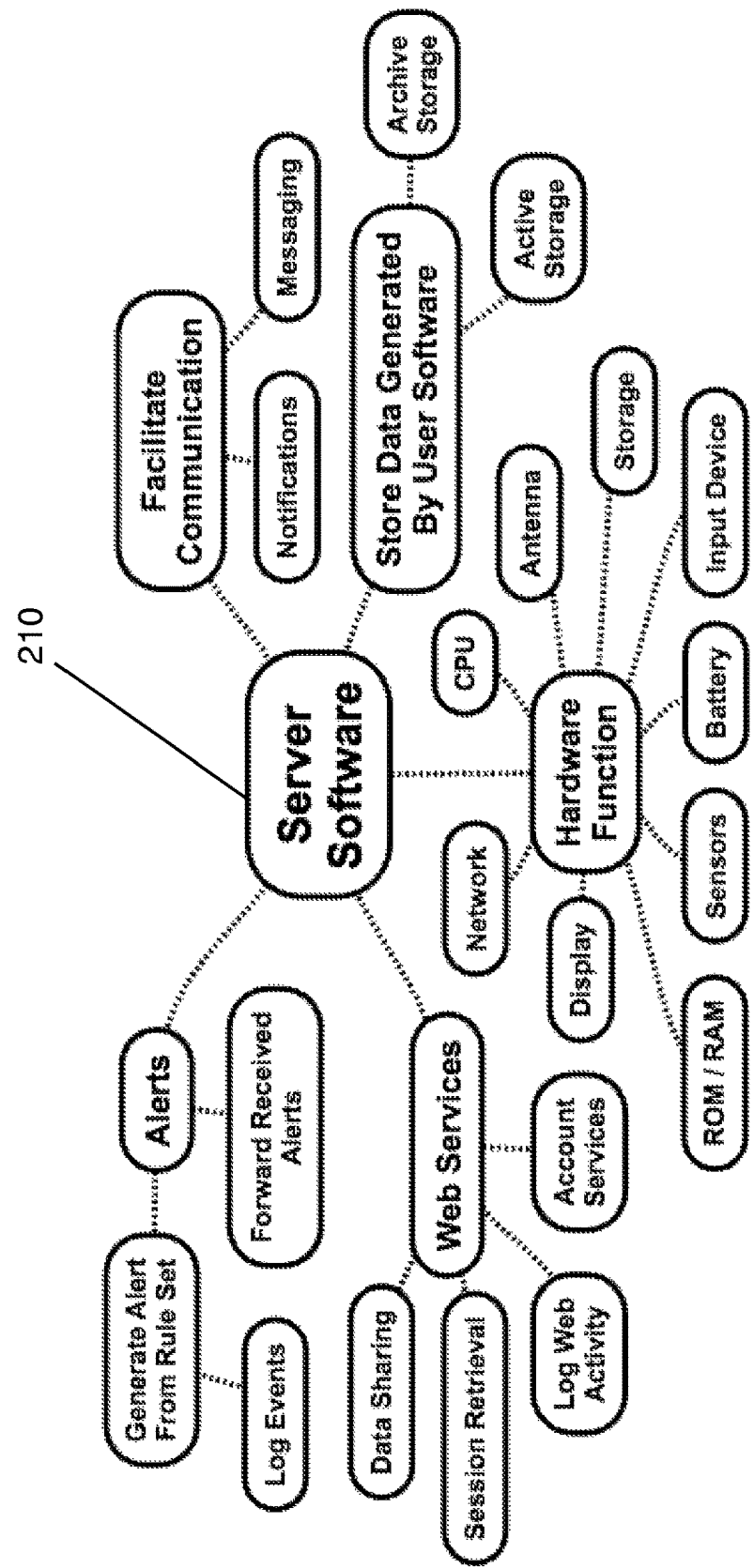
FIG. 11B illustrates the functionality of the server software resident on the server system.

FIG. 11B is an illustration of the functionality of the server software (host application) 210 resident on the server system 200. The main features of the server software 210 are: Alert functions 220, Web Services functions 230, Hardware Management functions 240, Data Management and Storage functions 250, and Communications Facilitation functions 260.

The Alert 220 feature of the user software 110 is adapted to generate any of a number of potential alerts based on data received from a user device 100 in view of a rule set. The potential alerts that can be transmitted from the server system 200 to: the user device itself, to other user devices in the session and to third parties. Content of an alert can range from an advisory (e.g., user device battery state) to the dispatch of emergency public health and/or security services to the last geo-location of the user device 100, and to the notification of third parties. The Web Services 230 feature provides for and manages communications between the server system 200 and a system website 710. The system website 710 may be hosted physically on the server system 210, or may be remotely hosted. The Hardware Management 240 feature of the server software 210 provides for and manages communication and interaction of the server system 200 with other ancillary hardware. The Data Management and Storage 250 feature manages (e.g., date/time stamping) and stores data generated by the user software 110 and received from the user device 100. This feature of the server software 210 in combination with the limitations on the Administrative Services 260 feature functions to prevent modification of and/or tampering with date/time stamped data received from a user device 100 to preserve the integrity of the user data. The safe storage of unalterable user data in the (active or archived storage) according to a proper rule set provides for a verifiable chain of evidence (custody) of the user data from the time of its generation and initial date/time stamping at a user device 100 to a time subsequent when it is copied from a server database 214, for example, for the reconstruction of events of a particular user session 30. The Communication Facilitation 270 feature of the server 200 functions as a messaging hub and facilitates routing and push notifications with the user device 100.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A system (10) for producing an unalterable record of a monitored and reconstructable chain-of-evidence of date/time stamped session data from a user initiated personal rendezvous session (30), the system comprising:
    a server (200), the server (200) being capable of storing and executing an instruction set, and of communicating with at least one user device (100) via a network connection (170) with a global communications network;
    the user device (100) being capable of storing and executing an instruction set, the user device (100) connectable to the server (200) via the network connection (170);
    server software (210) of the system (10) for producing an unalterable record of a user initiated personal rendezvous session (30) resident on the server (200), the server software (210) managing communications with the at least one user device (100), collecting, aggregating, processing and storing the session data unalterably, dispensing the session data according to a chain-of-evidence rule set, and managing multiple sessions;
    user device session software (110) of the system (10) for producing an unalterable record of a user initiated personal rendezvous session (30) resident on the user device (100), the user software (110) adapted for execution by the user of the user device (100) to initiate the personal rendezvous session (30), and for managing session (30) communications with the server (200) and for initiating sessions, and date/time stamping all user device communications and generated session data in the context of the session (30), and setting up a session by a user action including inputting an ID/passcode of the user, starting a session by a user action which initiates a clocking function providing date/time stamping user device generated data and timed-interval communications, a mapping function providing positioning data, a hardware state function providing status of the user device including signal strength, connectivity status, and power level, and a session user interface (UI) at the user device for general communications, for making and communicating photos, audio recordings and forced position up-dates, and for initiating a panic function all via the server and user device software, and ending the session by initiating a session termination function, the user device personal rendezvous session software (110) in combination with the server software providing for establishing, and maintaining operation of the system (10); for monitoring the user device for a user device initiated call for execution of an in-case-of-emergency function and to terminate the session after a predetermined amount of time subsequent to receiving a user device initiated termination request; and
    a database (214) for storing the date/time stamped session data, and for dispensing an unalterable chain-of-evidence record for the session data of the personal rendezvous session, the database (214) in combination with the server software (210) and user software (110) provides at the server for receiving the session data, including all user device generated data and all communications received from the user device utilizing the user software (110), and unalterably recording in the database (214) with an additional server generated time/date stamp to allow verification of user communication times, and provide said unalterable date/time stamped chain-of-evidence record of the session data from a user initiated personal rendezvous session (30).

2. The system (10) for a monitored and reconstructable personal rendezvous session of claim 1, wherein the server (200) is selectable from the group of devices consisting of: a personal computer; a mainframe computer, a computer array, and a cloud-based computing system.

3. The system (10) for a monitored and reconstructable personal rendezvous session of claim 1, wherein the server (200) executes the server software and collects, aggregates, stores and communicates to and from a plurality user devices (100).

4. The system (10) for a monitored and reconstructable personal rendezvous session of claim 1, wherein the server (200) records all communications between user devices (100) and the server (200).

5. The system (10) for a monitored and reconstructable personal rendezvous session of claim 1, wherein all communications between user devices (100) while using the system (10) must pass through the server (200).

6. The system (10) for a monitored and reconstructable personal rendezvous session of claim 1, wherein the user device (100) is selectable from the group of user devices consisting of: a personal computer; a mobile computing device; an enhanced communications device; and a smart phone.

7. The system (10) for a monitored and reconstructable personal rendezvous session of claim 1, wherein the server software provides for data communication with the user device (100).

8. The system (10) for a monitored and reconstructable personal rendezvous session of claim 1, wherein the server software provides for administrative operations.

9. The system (10) for a monitored and reconstructable personal rendezvous session of claim 1, wherein the server software provides for user communications between one or more other user devices (100).

10. The system (10) for a monitored and reconstructable personal rendezvous session of claim 1, wherein the server software provides for output of session data to an in-case-of-emergency (ICE) contact function according to a set of ICE rules.

11. The system (10) for a monitored and reconstructable personal rendezvous session of claim 10, wherein the server software provides for output of user data via an ICE contact function according to a set of ICE rules in response to an ICE contact query.

12. The system (10) for a monitored and reconstructable personal rendezvous session of claim 1, wherein the user device software provides for determining and/or recording user device location, user device communications, user device generated data, user device operational status (including battery condition/life), and for communicating with the server software (210) of the server, and for caching for later transmission upon loss of communication with the server (200).

13. A chain-of-evidence record system (10) for generating and remotely storing an unalterable chain-of-evidence record of date/time stamped data of a user initiated personal rendezvous session (30) from a user device (100) admissible as evidence in a court of law, the system comprising:

the user device (100) being capable of storing and executing an instruction set, the user device (100) connectable to the server (200) via the network connection (170);

user device session software (110) of the chain-of-evidence record system (10) resident on the user device (100), the user session software (110) adapted for execution by the user of the user device (100) to setup and initiate the personal rendezvous session (30) processes (400-490) and generating date/time stamp session data records of all user device communications and session data generated in the context of the session (30) to produce an unalterable chain-of evidence record of date/time stamped data of the personal rendezvous session (30) initiated at the user device (100), including date/time stamping user device generated data and timed-interval communications, mapping function positioning data, hardware state function status of the user device including signal strength, connectivity status, and power level, and general communications data, photographic data, audio recording data, environmental data, data for initiating a panic function via the server, and session termination data, and communicating the unalterable chain-of-evidence record of the user initiated personal rendezvous session (30) to a remote server (200);

a server (200), the server (200) being capable of executing an instruction set of the system (10) for generating and remotely storing the unalterable chain-of evidence record, and of communicating with at least one user device (100) via a network connection (170) with a global communications network;

server software (210) of the chain-of-evidence record system (10) resident on the server (200), the server software (210) managing communications with the at least one user device (100), receiving the unaltered chain-of evidence record of date/time stamped data of the user initiated personal rendezvous session (30) from the at least one user device (100), additionally time/date stamping the unaltered personal rendezvous session (30) when and as received, and unalterably storing the additionally time/date stamping the unaltered personal rendezvous session data (30) in an unalterable database, and, dispensing the session data (30) according to a chain-of-evidence rule set and the unalterable database (214) for storing the date/time stamped personal rendezvous session data unalterably, including all user device generated data, communications received from the user device utilizing the user software (110) are unalterably recorded on the database (214) with an additional server time/date stamp to allow verification of communication and recording times, to provide said unalterable date/time stamped chain-of-evidence record of the session data from a user initiated personal rendezvous session (30), and for outputting from the server (200) the unalterable chain-of-evidence record of the personal rendezvous session (30) from the user device (100) in digital and hardcopy formats admissible as evidence in a court of law.

14. The system (10) for a monitored and reconstructable personal rendezvous session of claim 13, wherein all communications sent by the user device (100) in the context of a session (30) are sent to the server (200).

* * * * *